US007529540B2

(12) United States Patent
Cox et al.

(10) Patent No.: US 7,529,540 B2
(45) Date of Patent: May 5, 2009

(54) METHOD AND SYSTEM FOR INVOKING PUSH-TO-SERVICE OFFERINGS

(75) Inventors: Douglas H. Cox, Holly Springs, NC (US); Vijay Dheap, Chapel Hill, NC (US); Baiju D. Mandalia, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 588 days.

(21) Appl. No.: 11/288,711

(22) Filed: Nov. 29, 2005

(65) Prior Publication Data

US 2007/0123222 A1 May 31, 2007

(51) Int. Cl.
*H04M 3/42* (2006.01)
*H04Q 7/38* (2006.01)
*H04Q 7/22* (2006.01)

(52) U.S. Cl. .................. 455/414.1; 455/403; 455/426.1; 455/426.2; 455/518; 455/519; 379/90.01; 379/156; 379/177; 379/201.01; 379/242

(58) Field of Classification Search ................. 455/403, 455/414.1, 426.1, 426.2, 518, 519; 379/90.01, 379/156, 177, 201.01, 242
See application file for complete search history.

(56) References Cited

U.S. PATENT DOCUMENTS

| 5,732,130 | A | 3/1998 | Iapalucci et al. | |
| 6,101,242 | A | 8/2000 | McAllister et al. | |
| 6,594,347 | B1 | 7/2003 | Calder et al. | |
| 6,636,590 | B1 * | 10/2003 | Jacob et al. | 379/114.05 |
| 6,650,735 | B2 | 11/2003 | Burton et al. | |
| 6,650,902 | B1 * | 11/2003 | Richton | 455/456.3 |

(Continued)

FOREIGN PATENT DOCUMENTS

EP    1 505 844 A1    2/2005

OTHER PUBLICATIONS

"Connecting to On-Line Car Shoppers: Auto Sellers Use NetCall Internet Call-Button Tehcnology to Turn 'Clicks' Into Interactive Sales", PR Newswire, p. 4089, Jul. 16, 1999.

(Continued)

*Primary Examiner*—Stephen M D'Agosta
(74) *Attorney, Agent, or Firm*—Akerman Senterfitt

(57) ABSTRACT

The present invention includes a method and system for invoking service offerings. The method can include the steps of initiating (320) a push-to-service request, enabling (304) a Voice Recognition Server (VRS), ranking (306) a list of supported service offerings, and presenting the list on a display for identifying at least one service offering that is available as a service to the user. The method and system can include speaking (308) a voice request for selecting at least one service presented on the display, and establishing (310) a communication dialogue with a service provider of the service for connecting the service provider for providing the service to the user.

The push-to-service request can be invoked by a user depressing a service button (120) on the first communication unit (100) using a push-action. The VRS (220) can handle the voice request and generate a list of service offerings ranked by priority for presentation on the display. The process can include a control protocol to negotiate at least one device characteristic with at least one service provider.

1 Claim, 5 Drawing Sheets

U.S. PATENT DOCUMENTS

| | | |
|---|---|---|
| 6,731,724 B2 | 5/2004 | Wesemann et al. |
| 6,801,604 B2 | 10/2004 | Maes et al. |
| 6,801,899 B2 | 10/2004 | Lauffer |
| 6,920,425 B1 | 7/2005 | Will et al. |
| 7,107,017 B2 * | 9/2006 | Koskelainen et al. ....... 455/90.2 |
| 2004/0052339 A1 | 3/2004 | Mirashrafi et al. |
| 2004/0266468 A1 | 12/2004 | Brown et al. |
| 2005/0141685 A1 | 6/2005 | Bennett, III. et al. |
| 2005/0255861 A1 * | 11/2005 | Wilson et al. ............ 455/456.2 |

OTHER PUBLICATIONS

"Netcall Internet Call-Buttons Enhance E-Commerce Customer Service and Sales", PR Newswire, p. 7431, Aug. 6, 1999.

Medman, N., et al., "Ericsson Instant Talk", Ericsson Review, vol. 81, No. 1, pp. 16-19, 2004.

"Voice Cybervault for Local and Internet Logins", IBM Corp., Research Disclosure, No. 431176, pp. 586-587, Mar. 2000.

* cited by examiner

METHOD AND SYSTEM FOR INVOKING PUSH-TO-SERVICE OFFERINGS

BACKGROUND

1. Field of the Invention

The present invention relates to the field of communication systems and, more particularly, to a method and system for making service offerings available on a priority basis using voice invocation.

2. Description of the Related Art

Communications systems can provide users with interconnect services and dispatch services. Dispatch services are typically provided by two-way radio systems, unlike the interconnect services provided by today's cellular systems. A dispatch group call service, for example, enables a user to communicate with a group of people simultaneously, usually just by depressing a push-to-talk (PTT) button. The PTT technology avoids call set-up time and enables individuals to immediately engage in half-duplex conversation over the interconnect system.

Evolution of voice over wireless IP has enabled improvements in Push-to-Talk (PTT) which has taken the form of Push-To-Talk over Cellular (PoC). PoC is not restricted by two-way calling limits or multiple call set up controls, and allows more individuals to be connected and active on a call simultaneously. PoC utilizes the internet protocol as the dominant transport technology which can support higher layer protocols to establish, modify, and control multimedia sessions between multiple clients. Multimedia sessions based on the internet protocols facilitate flexibility in establishing mobile data services. Mobile data services are offered by service providers to obtain information content, and to perform transactions. Mobile data services operate according to an open standard for improving access and interaction with mobile internet applications. The common application framework provided by the IP multimedia sessions establishes and controls multimedia sessions for mobile application services.

The multimedia session protocols provide the communication medium and media types and transports to invoke and connect a multimedia session. However, they are not concerned with how the user of the service interacts with the service provider, or how they communicate with the service interface, or when the media is provided, and if the media is delivered in a timely and pertinent manner. Prior Art Voice Recognition Server (VRS) technologies within the telephone infrastructure provide for applications such as interactive voice response (IVR). However, a user generally needs to know a number, or find the number, of a voice response service to engage the voice based application. Access mechanisms and service numbers are not directly available to a user. A need therefore exists to discover services.

SUMMARY OF THE INVENTION

A method for invoking service offerings via voice is provided. The method includes initiating a push-to-service request from a first communication unit to a second communication unit. The push-to-service request can be invoked by a user depressing a service button on the first communication unit. A Voice Recognition Server (VRS) can be enabled at the second communication unit for receiving the push-to-service request to notify the second communication unit that the user is intending to interact with the VRS. The push-to-service request can include a control protocol to negotiate at least one device characteristic with a service provider associated with a service offering. A list of service offerings supported by the second communication unit can be ranked and presented as a list on a display of the first communication device. At least one service offering can be identified that is available as a service to the user. The user can speak into the first communication device for selecting one of the services presented on the display to be handled by the VRS. The VRS can establish a communication dialogue with the service provider selected for connecting the service provider to the first communication device and provide the service to the user.

A method for configuring a list of service offerings is also provided. The method can include the steps of categorizing a list of service offerings. The list can contain services the user has previously registered for, or is presently registering. Each service can belong to at least one category each containing a list of services. Based on the time of service and the user's schedule or availability, the list of services is narrowed in each category to identify an appropriate set of services given the user's schedule and availability. For example, wherein the time identifies in each category what service offerings are timely available to the user, and the step of narrowing ranks the list of services within each category on a scale of timeliness to generate a narrowed list.

A push-to-service system is also disclosed for invoking service offerings via voice. The system can include a push-action button on a first communication device to initiate a push-to-service request. A display on the first communication device can be positioned close to the push-action button to activate upon a user depressing the push-action button. A processor within the first communication device can process the push-to-servise request and present a list of available service offerings. In one arrangement, the push-to-service can present to the user, service offerings based on a factor of timeliness and pertinence, in accordance with the schedule and availability of the user. The process can include a control protocol to negotiate at least one device characteristic with a service provider associated with a service offering. An audio unit allows a user to speak into the communication device for selecting a listed service which will be processed by a VRS.

BRIEF DESCRIPTION OF THE DRAWINGS

There are shown in the drawings, embodiments that are presently preferred; it being understood, however, that the invention is not limited to the precise arrangements and instrumentalities shown.

DETAILED DESCRIPTION OF THE INVENTION

The present invention includes a method and system for invoking service offerings. The method can include the steps of initiating a push-to-service request from a first communication unit to a second communication unit, enabling a Voice Recognition Server (VRS) at the second communication unit after receiving the push-to-service request, ranking a list of service offerings supported by the second communication unit, presenting the list on a display of the first communication device for identifying at least one service offering that is available as a service to the user. The method and system can include speaking a voice request into the first communication device for selecting at least one service presented on the display, and establishing a communication dialogue with a service provider of the service for connecting the service provider to the first communication device for providing the service to the user. For example, the push-to-service request can be invoked by a user depressing a service button on the first communication unit, where the depressing can be a push-action. The push-action can notify the second communication unit that the user is intending to interact with the VRS. For example, the voice request can be sent to the second communication unit for handling the voice request within the VRS. In another example, the list of service offerings can be ranked by a priority to present the list on the display for providing at least one service offering that is available as a service to the user based on the priority. For example, the priority can be a time stamp, a calendar, an address book, a voice mail, a contact, or a personal message.

Figure 1:
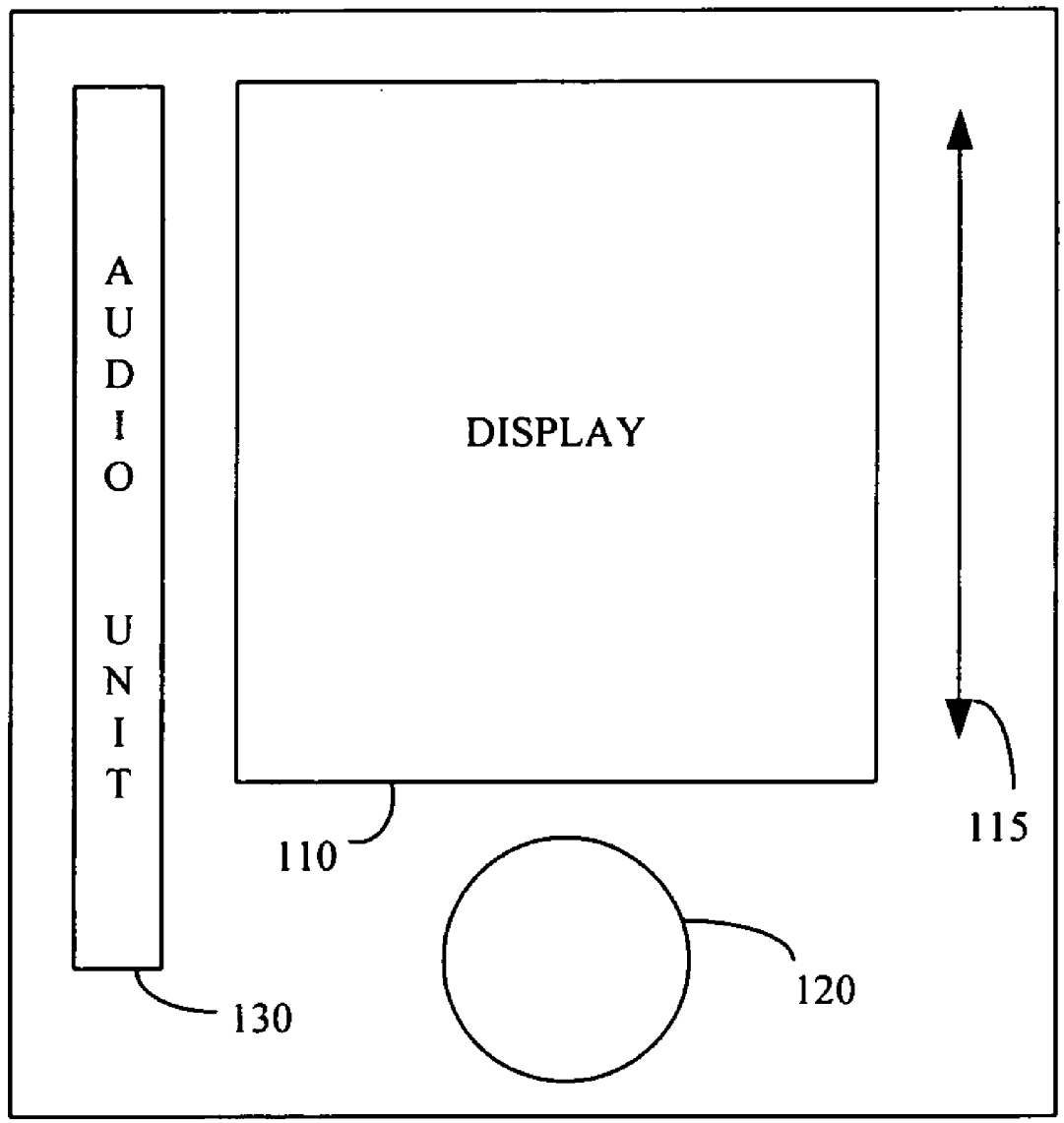
FIG. 1 is a schematic depiction of a communication device in accordance with an embodiment of the inventive arrangements disclosed herein.

FIG. 1 is a schematic illustration of a communication device 100 for invoking service offerings via voice. The device 100 can include a display 110, a push-action button 120, and an audio unit 130. The display 110 can include a scroll bar 115 to scroll text and voice messages on the display 110. The audio unit 130 can contain a microphone, a speaker, and supporting audio processing logic. The device 100 is not limited to the components shown. In one arrangement, the push-action 120, the display 110, and the audio unit 130 are interconnected amongst one another to interface, communicate, and present service offering information to the user of the device 100. As an example, a user can depress the push-action 120 to initiate a service offering request and speak into the device 100 through the audio unit 130. A list of service offerings available to the device can be presented in a scroll list form or any other suitable text arrangement form on the display 115.

Figure 2:
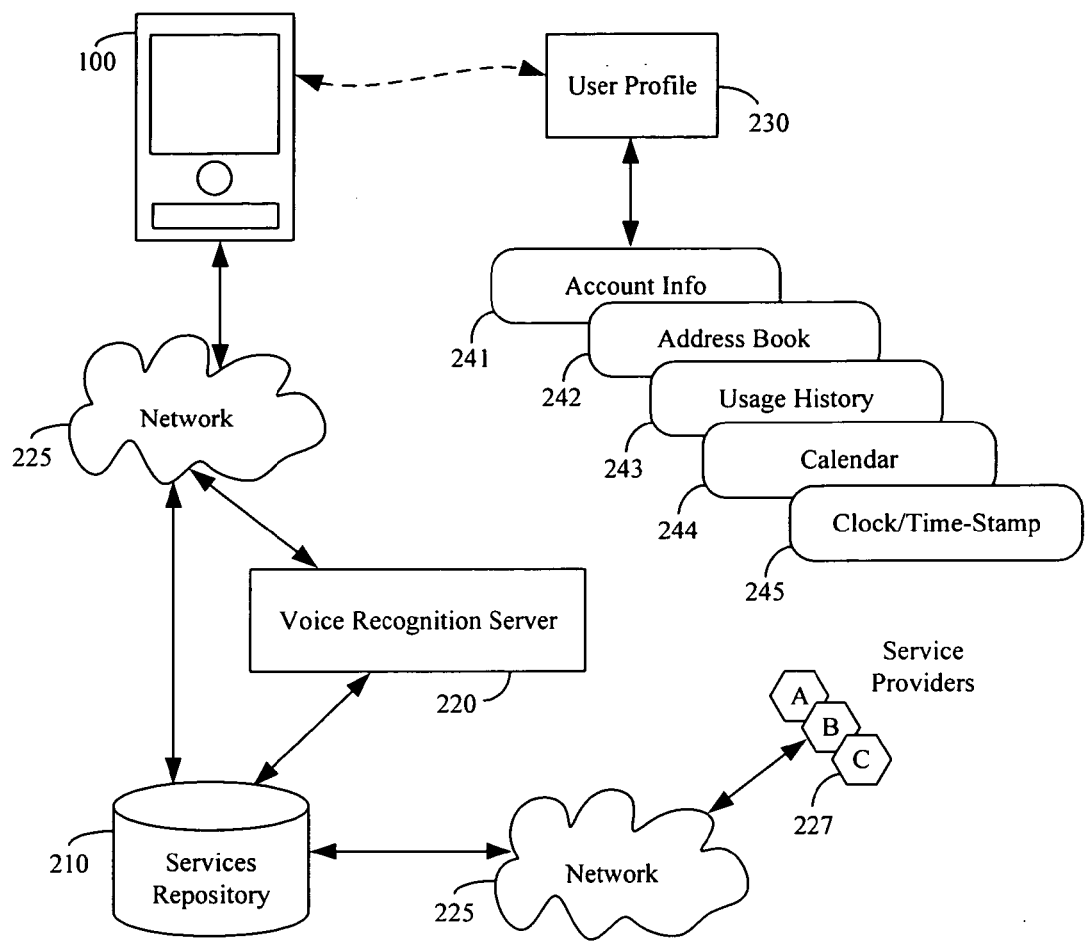
FIG. 2 is a schematic depiction of a communication system in accordance with the embodiment of the inventive arrangements disclosed herein.

Referring to FIG. 2, a system 200 for invoking service offerings is schematically shown. In one arrangement, the system 200 can include a communication device 100, a Voice Recognition Server (VRS) 220, a services repository 210, and a network 225. The communication device 100 can interact with the VRS 220 for sending and receiving voice and data. The VRS 220 can establish and proxy connections to services offered by the services repository 210. For example, the services repository 210 can include a list of services available to the VRS based on the service configuration support of the network 225. The VRS 220 can communicate with the communication device 100 over the network 225 such as a telecommunications infrastructure which can support packet or circuit switched technology for cellular communications or internet connectivity. The communication over the network 225 can also be over a wired landline circuit switched technology. Also, the communication channel can support Voice Over IP (VoIP), RTP, or UDDI over the internet protocol. The communication device 100 can be a wireless device for establishing a communication dialogue over a cellular communication channel or an internet connection.

The VRS 210 can support and access a services repository 210 which can be interconnected to a number of service providers 227. For example, the services repository 210 can include database functionality for handling communication between service providers 227 and the services being offered to the communication device 100. For example, the services repository 210 can include a Universal Description, Discovery and Integration (UDDI) Business Registry database that facilitates the participation of business in the e-commerce and business-to-business marketplaces. The UDDI business registry can describe the business of the service providers, it can discover business partners, and it can use technical standards to communicate with others through the network 225. The UDDI Business Registry can make the service providers more visible and accessible to the communication handset 100.

The communication device 100 can include a user profile 230 which can contain personal information and account information. The user profile 230 is not limited to providing only personal or account information. The user profile can contain any relevant information a user or a service provider deems appropriate for including within a user profile 230. For example, the user profile 230 can include account info 241, an address book 242, usage history 243, a calendar 244, and a clock time-stamp 245. The user profile 230 can also include a voice mail, a contact, a personal message, and a personal profile but are not limited to these entries. The communication device can also include a clock for creating a time-stamp message that can be transmitted over the network 225 to the VRS 220. Briefly, the user profile 230 is accessible to the service providers 227 for assisting them in determining suitable content to provide to the user of the communication device 100.

Figure 3:
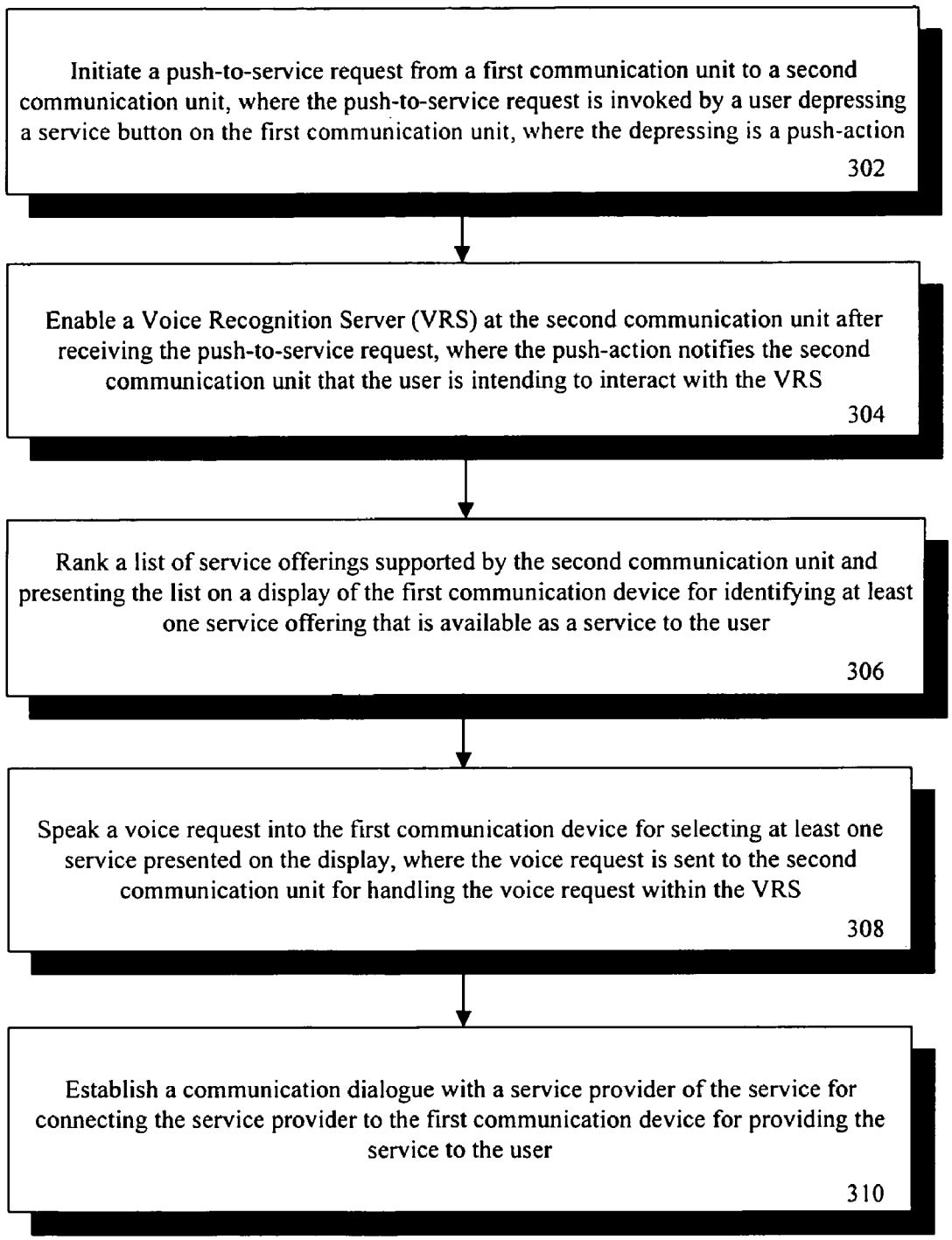
FIG. 3 is a method for invoking service offerings using the communication device of FIG. 1 in accordance with the embodiment of the inventive arrangements disclosed herein.

Referring to FIG. 3, a method 300 for invoking service offerings using a communication device is shown. When describing the method 300, reference will be made to FIGS. 1 and 2. It should be noted that the method can be practiced in any other suitable system or device. Moreover, the steps of the method 300 are not limited to the particular order in which they are presented in FIG. 3. The inventive method can have a greater number of steps than those shown in FIG. 3.

At step 302, a push-to-service request can be initiated from a first communication unit to a second communication unit. For example, the push-to-service request can be invoked by a user depressing a service button on the first communication unit where the depressing constitutes a push-action. For example, referring to FIG. 2, a user can depress the push-action button 120 to initiate a request. The communication unit 100 can process the push-action request by sending a message over the communication network 225 to a receiving communication unit. The receiving communication unit can be or include a Voice Recognition Server (VRS) 220.

At step 304, the Voice Recognition Server (VRS) at the second communication unit can be enabled after receiving the push-to-service request. The push-action notifies the second communication unit that the user is intending to interact with the VRS 220. For example, the push-action informs the VRS 220 that a user will be interacting with the VRS for receiving service offering information. For example, referring to FIG. 2, the user initiates a push-action for receiving a set of service offerings to choose from. The push-to-service request can signal the VRS 220 with a set up time window to prepare a service registry for the user. The preparation establishes lines of communication to the service providers 227 to save time after the user decides from a list of services provided what service to select. For example, the push-to-service request will result in a list of service offerings being presented by the VRS 220 to the user on the display 110 of the communication device 100. The set up time window is the amount of time expiring between when the user depresses the push-action button and when the user makes a service selection. The enabling of the VRS push-to-service reduces the delay in connecting the service after the user makes a decision since the lines of communication will already be open.

In one arrangement, the push-action also signifies to the VRS 220 that the user not only wants service offering information, but the user desires the VRS 220 to selectively determine what services are most appropriate with regard to a priority for the user.

At step 306 a list of service offerings supported by the second communication unit is ranked and presented for identifying at least one service offering that is available as a service to the user. For example, referring to FIG. 2, the VRS 220 determines a list of service offerings that are available to the user of the communication device 100. The VRS 200 communicates with the services repository 210 for receiving and sending information pertinent to services the user is interested in receiving. For example, the VRS 220 evaluates priority information as to which services the user is interested in receiving. For example, the VRS 220 can receive this priority information in advance of a service request or as part of the service request. The priority information can be contained within a user profile 230 of the communication device 100, or the priority information can be made available to the VRS 220. For example, the communication device 100 can send the user profile 230 to the VRS 220 when the user depresses the push-action button 120. The VRS 220 uses the priority information available within the user profile 230 for selecting what services are most appropriate for presentation to the user. For example, an appropriate service is one that is timely with the schedule of the user, or one that is pertinent to the preferences of the user. Establishing a protocol for communicating this priority information in a message is described below. Referring to FIG. 2, The VRS 230 can parse the user profile 230 and determine which services are preferable with regard to information contained in the user profile 230 on a display of the first communication device.

At step 308, the user can speak into the first communication device for selecting at least one service presented on the display. For example, the voice request can be sent to the second communication unit for handling the voice request within the VRS. For example, referring to FIG. 2, the user can receive a list of service offerings presented on the display 110. The list of service offerings present a list of services the user can select from. The user can review the available services using the scroll bar 115 and receive additional information on the services by submitting a voice request or depressing the push-action button 120. The user can speak into the audio unit 130 which is capable of capturing and processing voice. The audio unit 130 can convert the voice into a suitable format for processing by the VRS 220. The communication device 100 can communicate with the VRS 220 to determine which format is suitable. The audio unit 130 can prepare to receive voice when the user depresses the push-action button. For example, the user can invoke a service request via a push-to-service action of the push-action button. The communication device 100 recognizes that the device is entering a push-to-service mode which will require a voice request reply. The audio unit 130 can turn itself on when it receives notice from the push-action button. The audio unit can begin voice capture or voice recording within a certain time frame of the push-action button being depressed to save processing power. For example, the audio unit 130 may not need to turn on immediately because of the processing delay time by the VRS 220 in returning a list of service offerings. The audio unit 130 will attempt to turn on at an appropriate time as determined by the time delays associated within the communication network 225 and system 200. The audio unit 130 can employ a voice activity detector or other suitable device for capturing audio.

At step 310, a communication dialogue can be established with a service provider of the service for connecting the service provider to the first communication device for providing the service to the user. For example, referring to FIG. 2, the user can select a list of service offerings presented on the display 110 by speaking the name of the service into the phone. The user can speak the exact name of the service listed on the display or a recognizable alternative to the service. The VRS 220 can include a Text-to-Speech system, a Natural Language Understanding System (NLU), a voice recognition system (VR), a voice identification system and other suitable voice processing systems without being limited to any one or any particular combination. The VR and NLU provide flexibility in allowing the user to substitute variations of the service name listed. A VR and NLU system can account for speaker characteristics and variations in voice due to pitch, inflections, or intonations in recognizing the spoken service. The VRS 220 can convert the voice information into any other suitable text or format such as HTTP or VoiceXML. Additionally, the voice detection, recognition, and understanding can be accomplished within the communication device 100. The voice can be encoded and sent to the VRS 220 for service offering connection. Referring back to the method 300, a communication dialogue is established for connecting a service provider to the communication device. The VRS 220 can include a UDDI business registry that describes the type of connection services available to the service providers. The step of initiating a push-to-service request follows with an enabling of the VRS 220 to establish lines of communication. At the time the list of service offerings is presented on the display 110, the system 200 has already established lines of communication between the service providers and the communication device. At the time the user selects a particular service, the VRS 220 establishes a communication dialogue by formally connecting only the service provider requested and the communication device 100. The VRS 220 follows standard communication channel protocols for setting up the communication channel between the service provider and user.

The VRS can also convert the list of service offerings from a text format to a VoiceXML format for playing synthesized voice out of the first communication device. The communication device 100 or the VRS 220 can also receive data in VoiceXML format. For example, referring to FIGS. 1 and 2, the VRS 220 can transmit a list of service offerings to the communication device 100 upon receipt of a push-to-service request. The list of service offerings can be presented on the display 110 and the text can be converted to speech for playing out the phone. For example, the audio unit 130 can include a text-to-speech system which converts the text and plays it to the user.

Figure 4:
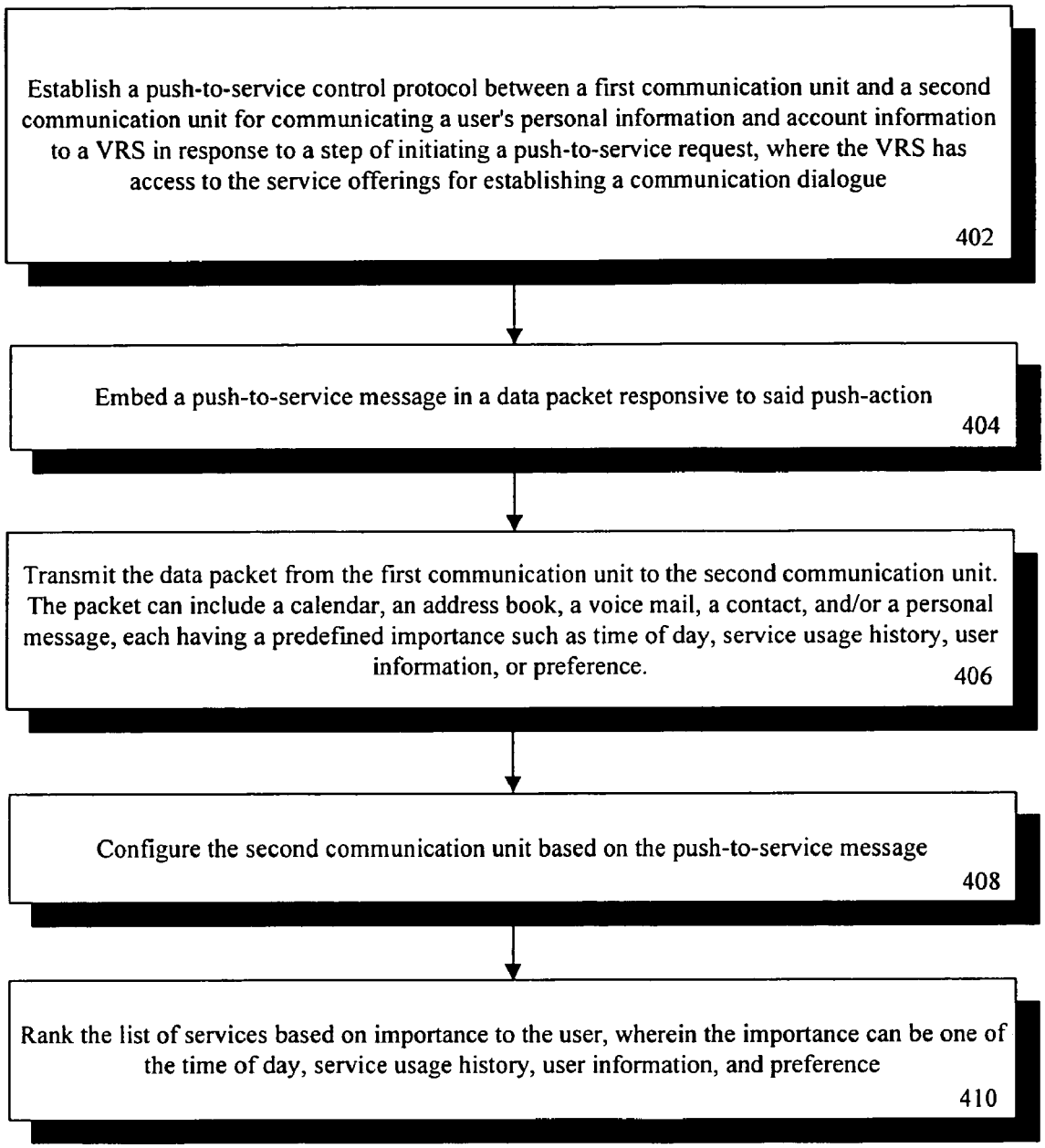
FIG. 4 is a flowchart for a method of communicating push-to-service messages in accordance with the embodiment of the inventive arrangements disclosed herein.

Referring to FIG. 4, a method 400 is provided for communicating push-to-service messages. When describing the method 400, reference will be made to FIGS. 1 and 2. It should be noted that the method 400 can be practiced in any other suitable system or device. Moreover, the steps of the method 400 are not limited to the particular order in which they are presented in FIG. 4. The inventive method can have a greater number of steps than those shown in FIG. 4.

At step 402, a push-to-service control protocol can be established for communicating a user's profile to a VRS that has access to a list of service offerings. The user profile can include personal information and account information. The protocol is established in response to the user initiating a push-to-service request.

At step 404, a push-to-service message can be embedded in a data packet responsive to the push-action. For example, referring to FIG. 1 and 2, the user depresses the push-action button 120 for initiating a push-to-service request on the communication device 100. The communication device 100 transmits a message to the VRS 200 to signal that the user intends to interact with the VRS for obtaining a list of service offerings. The message includes the user profile 230. The communication device 100 encapsulates a priority from the user's profile 230 into the message, and the communication device 100 transmits the message within a data packet to the VRS 220. The priority can be a time stamp, a calendar, an address book, a voice mail, a contact, a personal message, and/or a personal profile within the user's profile 230.

At step, 406 the data packet can be transmitted from the first communication unit to the second communication unit. For example, referring to FIGS. 1 and 2, the communication device 100 can encapsulate priority information into a message and can transmit the message to the VRS 220. The packet can include a calendar, an address book, a voice mail, a contact, and/or a personal message, each having a predefined importance such as time of day, service usage history, user information, or preference. Embodiments of the invention include parameters required by the service to be included in the data packet. The parameters may be certain elements of the user's profile, or the user may optionally provide them. For example, a user can specify a type of restaurant when requesting a push-to-service request such as a dining service.

A step 408, the second communication unit can be configured based on the push-to-service message. For example, the time-stamp identifies what service offerings are timely to the user. For example, referring to FIG. 2, the second communication unit configures the VRS 220 based on the message priority and ranks the list of service offerings on a scale of timeliness. As another example, the calendar expresses the availability of the user. The second communication unit configures the VRS 220 based on the priority in the message and ranks the list of service offerings based on the availability of the user in view of the calendar. Additionally, the second communication unit configures the VRS 220 to list services based on importance to the user. For example, the importance can be the time of day, service usage history, user information, or a personal preference.

As a practical illustration of the method, the user can have a calendar 244 that is up to date and reveals where the user is or will be. For example, the user on May 1 may enter into the calendar 244 that he will be out of town on business in Nantucket on May 5. The user profile 230 can identify the May 5 date as a business priority. The user profile 230 can also scan the address book for a Nantucket entry and associate any Nantucket entries with an address priority. On the May 5 date of the business trip the user can issue a push-to-service request to find restaurants in the area. The user does not need to enter the city information because the system 200 recognized that the user was in Nantucket from the user profile 230. The VRS 220 accesses the priority information in the message and finds appropriate service offerings within the area, e.g., restaurants that are in the city of Nantucket. The user can also issue a push-to-select for finding hotels in the area associated with the user's addresses, which on that day pertain to hotels in Nantucket based on the user profile 230.

Figure 5:
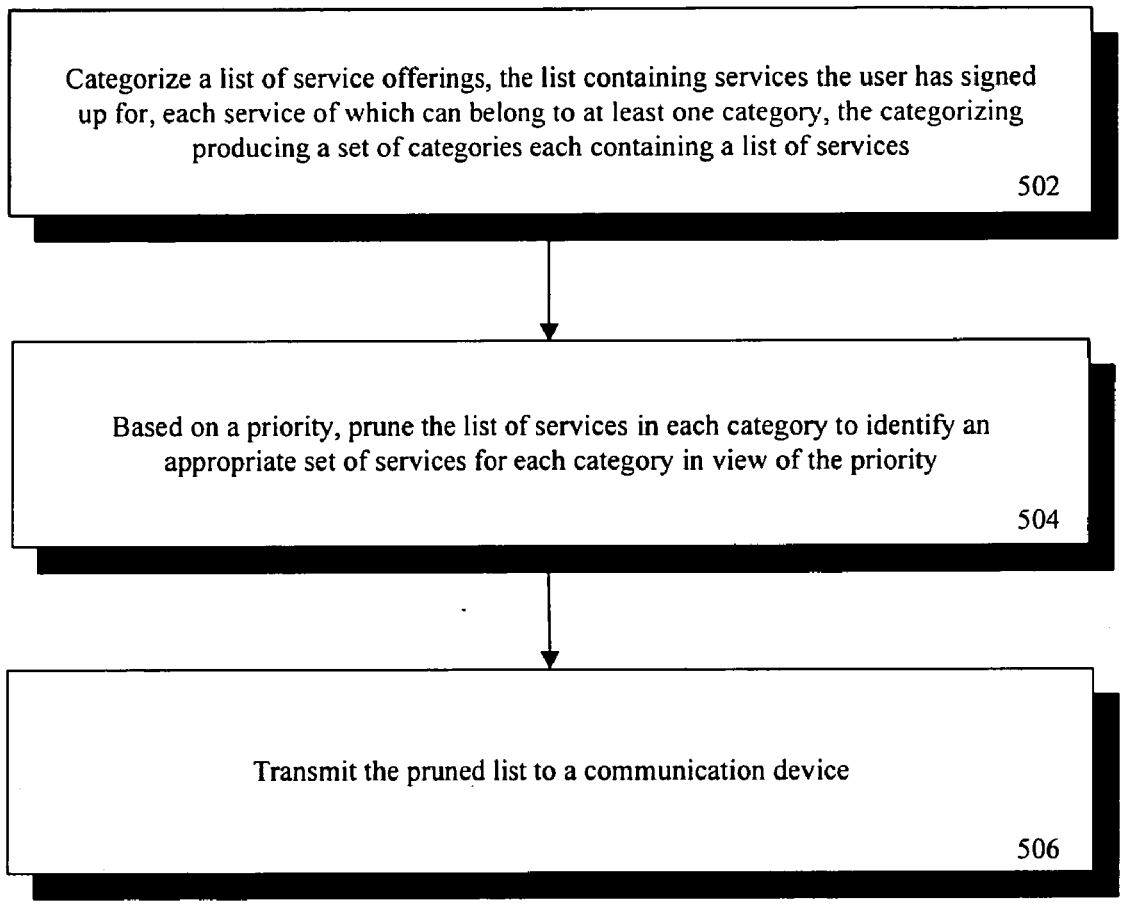
FIG. 5 is a flowchart illustrating a method for narrowing a list of service offerings received from a push-to-service request in accordance with the embodiment of the inventive arrangements disclosed herein.

Referring to FIG. 5, a method 500 is provided for narrowing a list of service offerings received from a push-to-service request. When describing the method 500, reference will be made to FIGS. 1 and 2. It should be noted that the method 500 can be practiced in any other suitable system or device. Moreover, the steps of the method 500 are not limited to the particular order in which they are presented in FIG. 5. The inventive method can have a greater number of steps than those shown in FIG. 5.

At step 502, a list of service offerings can be categorized. The list of service offerings is a list of services the user has requested in the past. For example, a service can be receiving a mobile message surf report from a weather channel, receiving a mobile coupon from a restaurant, receiving a football game update from a sports provider. A service can be any form of mobile business communication where a service provider renders a service to the user. The list of service offerings is also updated any time the user refreshes or adds new services. Each service can belong to at least one category, the categorizing producing a set of categories each containing a list of services. For example, a category can be 'movies', 'restaurants', 'pet stores', 'weather', 'traffic', 'sports', and 'news'. The list of categories are not limited to those described and can include any other subjects which appeal to a mobile customer audience. There can be multiple services associated with each category. For example, the sports category can have services for coupons, betting, games, events, and so on. The categories can also be a time of day, a usage history, a preference, an importance, and a personal profile. For example, the most recent services used would be available under the usage history. The categorizing of each list can also be ranked according to time, pertinence, schedule, and location, but is not limited to these. Each category can be ranked by time. For instance, movies can be listed by time, sports can be listed by time, and news can be listed by time. Accordingly, the categories can be ranked by pertinence. For example, the user may prefer a ranking of the sports category in order of football, soccer, baseball and hockey. For example, referring to FIG. 2, the VRS 220 can rank the categories upon receipt of a push-to-service request after receiving the message containing the priorities in the user profile 230. Importantly, the ranking is accomplished by the VRS 220 determining which services are pertinent and timely to the user in view of the service offerings available based on the user profile.

At step 504, the list of services is narrowed to identify an appropriate set of services for each category for the user. For example, the priority identifies in each category which service offerings are timely to the user, and the step of narrowing ranks the list of services within each category on a scale of timeliness to generate a narrowed list. Referring to FIG. 2, the VRS 230 scans the message for the priorities, identifies service offerings which match the priority (criteria), and based on the priority, narrows the list of services in each category to identify an appropriate set of services for each category in view of the priority. At step 506, the method 500 can also include transmitting the narrowed list to a communication device. For example, referring to FIG. 2, the VRS 220 can be accessible to or contained within a second communication unit. The communication unit can transmit and receive data and accordingly transmit the narrowed list to the communication device 100. The communication device 100 can present the narrowed list on the display 110 which can be visualized by the user. The user can speak into the phone at the radio unit 130 to select a service. The communication device 100 can accordingly offer the service. In addition, the user can continue to interact with the service through voice prompting. The service can present text or voice messages to the user for prompting the user for a voice response or input to assist the user with their selection. The communication unit 100 receives text or voice format data packets from the VRS 220 and presents them to the user. The user can speak into the device to complete the service.

For example, in the morning a user pushes the Push-to-Service (push-action) button 120 on a cell phone (communication device 100). A list of services that the user usually uses in the morning is presented by the system 200 on the screen display 110 (i.e., Traffic, Weather, News, Flights, Sports Scores, etc). At the top of the list is the Traffic service used frequently by the user before leaving for work. The user invokes the traffic information service by saying "Traffic" into the audio unit 130. The VRS 220 then presents the user with the local traffic information using voice and a map on the display 110 using the cell phone number in the user profile 230 as an indicator of the user's locale. If the user is roaming, the user's cell phone will display the input requirements for fetching the traffic information (Zip Code, City, State etc.).

In the afternoon, the user clicks the Push-to-Service 120 on the office phone (communication device 100). The list of services presented to the user are—Call, Voicemail, Set up a Meeting/Conference Call, Email and Make Travel Arrangements. The user selects Email and the system 200 presents the set of inputs on the display 110. The user speaks the name of a colleague into the audio module 130, the VRS 220 fetches the email address of that person from the user's address book which is contained in the user profile 230. The user then proceeds to dictate the email through the office phone 100 to the VRS 220. The VRS reads back the email to the user for authorization. The user completes the process by saying "Send'.

At the end of the day, the user presses the Push-to-Service button 120 on the cell phone. The list of services that the user has subscribed for that are relevant during this time of day are presented (Traffic, Restaurant reservation, Restaurant information, Concert information, etc). The user chooses Restaurant reservation to reserve a table at a restaurant and completes the reservation.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for invoking service offerings, the method comprising the steps of:
    initiating a push-to-service request from a first communication unit to a second communication unit, wherein the push-to-service request is invoiced by a user depressing a service button on the first communication unit, wherein the depressing is a push-action, the initiating including embedding a push-to-service message in a data packet responsive to said push-action, transmitting the data packet from the first communication unit to the second communication unit, and configuring the second communication unit based on the push-to-service message and a scale of timeliness;
    enabling a Voice Recognition Server (VRS) at the second communication unit after receiving the push-to-service request, wherein the push-action notifies the second communication unit that the user is intending to interact with the VRS;
    ranking a list of service offerings supported by the second communication unit and presenting the list on a display of the first communication device for identifying at least one service offering that is available as a service to the user;
    speaking a voice request into the first communication device for selecting at least one service presented on the display, wherein the voice request is sent to the second communication unit for handling the voice request within the VRS; and
    establishing a communication dialogue with a service provider of the service for connecting the service provider to the first communication device for providing the service to the user
    wherein the message includes at least one of a time stamp, a calendar, an address book, a voice mail, a contact, and a personal message;
    wherein the time-stamp identifies what service offerings are timely to the user to enable ranking the list of service offerings based on the scale of timeliness;
    wherein the calendar expresses the availability of the user to enable ranking the list of service offerings based on the availability of the user in view of the calendar.

* * * * *